United States Patent [19]

Hamilton

[11] 4,123,938
[45] Nov. 7, 1978

[54] DEVICE FOR MEASURING THERMAL PARAMETERS

[75] Inventor: Douglas J. Hamilton, Tucson, Ariz.

[73] Assignee: University Patents, Inc., Stamford, Conn.

[21] Appl. No.: 687,895

[22] Filed: May 19, 1976

[51] Int. Cl.² ............................................. G01K 17/00
[52] U.S. Cl. ............................ 73/190 H; 73/362 SC; 73/DIG. 7
[58] Field of Search ............... 73/190 H, 204, 362 SC, 73/DIG. 7; 307/310

[56] References Cited

U.S. PATENT DOCUMENTS

| | | | |
|---|---|---|---|
| 2,972,885 | 2/1961 | Laub | 73/204 |
| 3,085,431 | 4/1963 | Yerman et al. | 73/204 |
| 3,138,025 | 6/1964 | Fingerson | 74/190 |
| 3,333,470 | 8/1967 | Fingerson | 73/27 X |
| 3,576,492 | 4/1971 | Rao | 310/307 |
| 3,648,518 | 3/1972 | Hans et al. | 73/204 |
| 3,683,692 | 8/1972 | Lafitte | 73/204 |
| 3,800,592 | 4/1974 | Jones | 73/204 |
| 3,828,332 | 8/1974 | Renai | 73/362 |
| 3,882,728 | 5/1975 | Wittlinger | 73/362 |
| 3,900,819 | 8/1975 | Djorup | 73/204 |
| 3,942,378 | 3/1976 | Olmstead | 73/204 |
| 3,968,685 | 7/1976 | MacHattie | 73/204 |
| 3,992,940 | 11/1976 | Platzer, Jr. | 73/204 |

OTHER PUBLICATIONS

Steedman, "A Solid State Oceanographic Current Meter," in J. Physics E(G.B.) vol. 5, #12, 12/72, pp. 1157-1162.

*Primary Examiner*—Herbert Goldstein
*Attorney, Agent, or Firm*—Martin Novack

[57] ABSTRACT

An apparatus for measuring temperature or, alternatively, for measuring the flow of thermal power to a substrate maintained at substantially constant temperature. In accordance with the invention there is provided a semiconductor substrate, such as a silicon substrate. A temperature sensing means is formed in the substrate and is operative to generate a first electrical signal as a function of the temperature of the substrate. Means are provided for generating a reference level, and a comparator is reponsive to the first electrical signal and the reference level for generating a control signal. A heater means is formed in the substrate and means are provided for driving the heater means in response to the control signal. Finally, means are provided for measuring the electrical power input to the heater. The measured electrical power input is, in various applications, a useful indication of the temperature of the ambient environment. In a preferred embodiment of the invention, the temperature sensing means comprises a PN junction in said substrate, and the voltage drop across this junction is used to develop the first electrical signal. In this embodiment, the heater means comprises a transistor formed in the substrate and the control signal is coupled to the base of the transistor. The thermal power flowing from the substrate is determined by the input power to the transistor and this power is, in turn, determined by measuring the collector current of the transistor.

1 Claim, 4 Drawing Figures

DEVICE FOR MEASURING THERMAL PARAMETERS

BACKGROUND OF THE INVENTION

This invention relates to electronic measurement devices and, more particularly, to a device for measuring the thermal parameters of an environment, such as the temperature of an environment or the thermal power flow to or from an environment.

Various types of electronic devices for measuring thermal parameters, such as electronic thermometers, have been developed in the past. Electronic thermometers generate electrical signals which represent the temperature of a medium being investigated, and these signals can be readily converted to a display and/or used to control a companion system.

Prior art electronic thermometers are generally found to be unduly complex and expensive or to suffer one or more of the following deficiencies: some thermometers have inadequate response time, of the order of seconds, which render them useless for some applications. Other electronic thermometer designs are found to have an output response which is undesirably non-linear with temperature. Still other suggested electronic thermometer designs require a reference temperature for comparison purposes, such a reference temperature being available in only a limited number of applications. A further problem with some prior art electronic thermometers is that their "zero setting" or their scale factor is not readily adjustable.

A further consideration as background for the present invention is that applications exist, such as in the field of biomedics, where it is desirable to have a device capable of measuring the flow of thermal power wherein the operating temperature of the measuring device itself is maintained substantially constant.

It is an object of the present invention to provide solution to the prior art problems and requirements as set forth.

SUMMARY OF THE INVENTION

The present invention is directed to an apparatus for measuring temperature or, alternatively, for measuring the flow of thermal power to a substrate maintained at substantially constant temperature.

In accordance with the invention there is provided a substrate, such as a silicon substrate. A temperature sensing means is formed in the substrate and is operative to generate a first electrical signal as a function of the temperature of the substrate. Means are provided for generating a reference voltage or current level, and a comparator is responsive to the first electrical signal and the reference level for generating a control signal. A heater means is formed in the substrate and means are provided for driving the heater means in response to the control signal. Finally, means are provided for measuring the power input to the heater. The measured power input is, in various applications, a useful indication of the temperature of the ambient environment.

In a preferred embodiment of the invention, the temperature sensing means comprises a PN junction in said substrate, and the voltage drop across this junction is used to develop the first electrical signal. In this embodiment, the heater means comprises a transistor formed in the substrate and the control signal is coupled to the base of the transistor. The thermal power flowing from the substrate is determined by the input power to the transistor and this power is, in turn, determined by measuring the collector current of the transistor.

The substrate of the present invention operates at substantially a constant temperature thereby minimizing non-linearity problems which could otherwise arise over the operating temperature range of a semiconductor sensor. The response time of the invented apparatus is relatively fast and the present invention requires only two leads to be connected thereto, which is advantageous in various applications where access is limited. The present apparatus requires no external reference temperature for operation and, as will be better understood hereinbelow, the apparatus of the invention is readily adjustable to desired "zero setting" or a desired scale factor.

Further features and advantages of the invention will become more readily apparent from the following detailed description when taken in conjunction with the accompanying drawings.

DESCRIPTION OF THE PREFERRED EMBODIMENT

Figure 1:
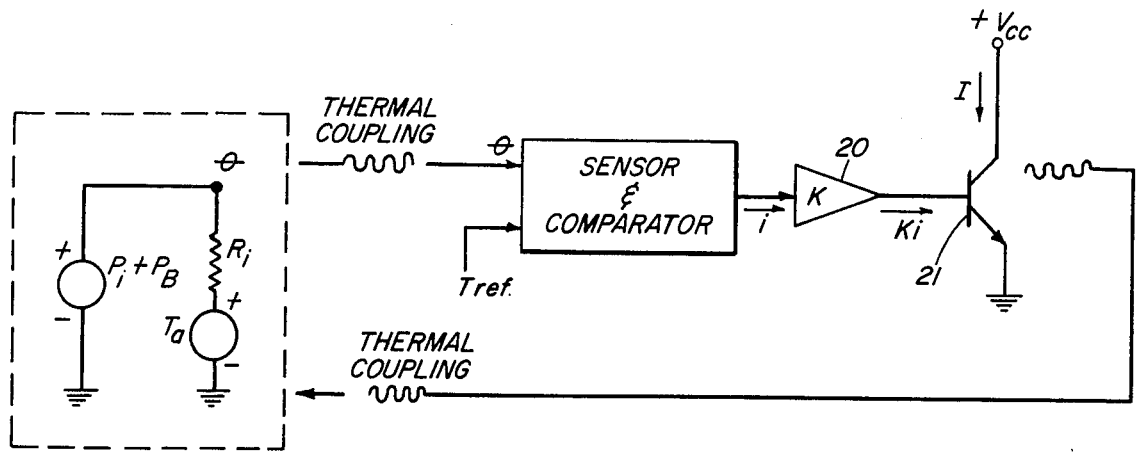
FIG. 1 is a block diagram which illustrates operation of the invention including considerations of thermal parameters therein.

FIG. 1 shows, in dashed line, a thermal equivalent circuit of an embodiment of the invention, along with simplified electrical schematic representations which are helpful in understanding the operation thereof. Consider a substrate for example a semiconductor chip separated by an insulator from an ambient environment having a temperature, $T_a$, which is to be determined. Power dissipated in the substrate (in a manner to be described) includes bias power, designated $P_B$, and feedback control power, designated $P_f$. As illustrated diagramatically, the chip temerature, $\theta$, is determined by the total power ($P_f + P_B$), the thermal resistance of the surrounding insulator, designated $R_i$, and the ambient temperature $T_a$ to be measured. As will be described, the chip temperature is converted by a sensor to a first electrical signal and this signal, typically a voltage level, is compared to a reference level, designated $T_{ref}$ which is a voltage or current equivalent of a selected reference temperature. The comparator generates a current, $i$, which is proportional to the difference ($T_{ref} - \theta$) and, after amplification by a factor K (unit 20), causes thermal power to be dissipated in the collector junction of a transistor 21. This power can be considered as the feedback power $P_f$, and the feedback power adjusts itself to minimize the difference ($T_{ref} - \theta$). The total power is determined by measuring the total current dissipated in the substrate, and, accordingly, the ambient temperature, $T_a$, is determinable.

The chip temperature, $\theta$, is given by $$\theta = T_a + R_i(P_f + P_B). \qquad (1)$$

The current output of the comparator is $$i = \gamma g (T_{ref} - \theta) \qquad (2)$$

where γ is the temperature coefficient of the sensor in volts/degree and g is the transconductance of the comparator in amps/volt. the collector current of transistor 21 is $$I = K\beta i \tag{3}$$

where K is the current gain of amplifier 20. As seen from FIG. 1, the thermal feedback control power can be expressed as $$P_f = V_{cc} I \tag{4}$$

where $V_{cc}$ is the bias voltage across the transistor 21.

Substituting equation (1) into equation (2) and inserting the result in equation (3), then solving for I using relationship (4) yields:

$$I = \frac{K\beta\gamma g[T_{ref} - T_a - R_i P_B]}{1 + K\beta\gamma g R_i V_{cc}} \tag{5}$$

$$= \frac{T_{ref} - T_a - R_i P_B}{(1/K\beta\gamma g) + R_i V_{cc}}$$

If K and β are selected large enough so that $K\beta\gamma g >> 1/R_i V_{cc}$, I can be expressed as $$I \simeq (T_{ref} - T_a)/R_i V_{cc} - P_B/V_{cc} \tag{6}$$

or, since the bias power, $P_B$, is the product of the bias voltage, $V_{cc}$, times the bias current, $I_B$ (i.e., the current other than I), we have $$I_B = (T_{ref} - T_a)/R_i V_{cc} - I \tag{7}$$

Figure 2:
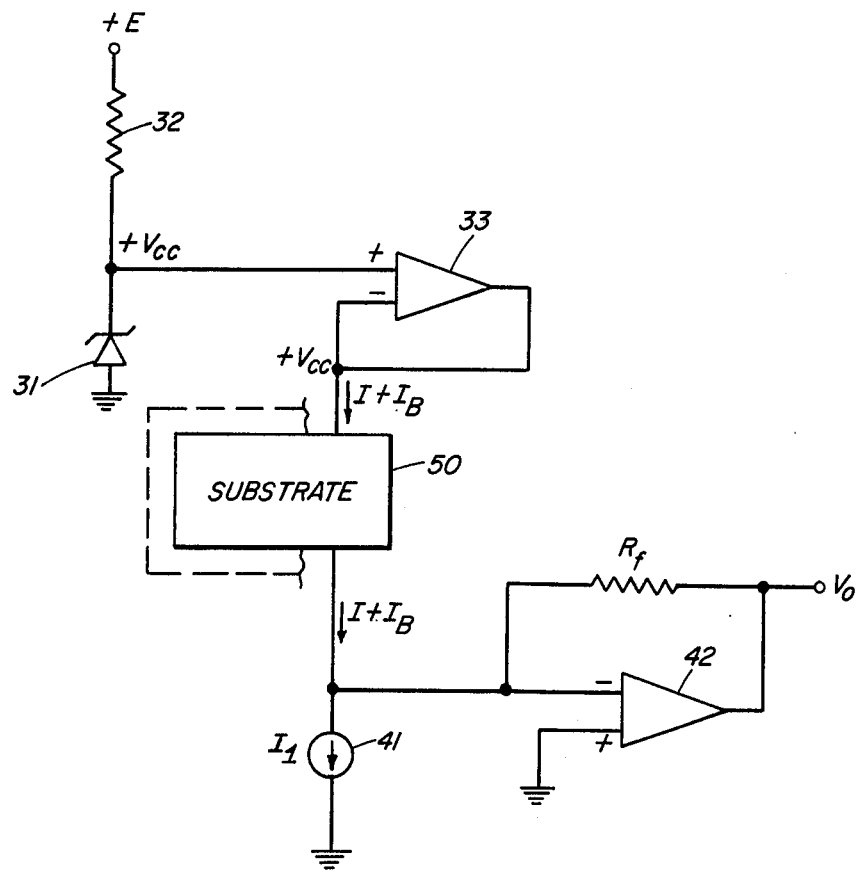
FIG. 2 is a schematic block diagram of an embodiment of the invention.

FIG. 2 is a block diagram showing a substrate 50 which includes the thermal circuit in accordance with the invention and circuitry utilized in conjunction therewith. A stable bias voltage $V_{cc}$ is obtained by utilizing a conventional "temperature compensated" zener diode circuit comprising a zener diode 31, a resistor 32, and an operational amplifier 33. A voltage source, +E, is coupled across the resistor 32 and the zener diode 31 in series arrangement, and the voltage developed across the zener diode is coupled to the positive input terminal of operational amplifier 33. The output of the operational amplifier 33 is coupled back to the negative input terminal thereof, and the voltage at this point is thereby maintained constant, as is known in the art. The current delivered to the substrate 50 is represented as (I + $I_B$) where $I_B$ is the bias current and I is the current representative of the thermal feedback power to be determined. Determination of total current is as follows: A dummy bias current, designated $I_1$, is subtracted from the total substrate current (I + $I_B$) using a constant current source 41 which may comprise, for example, another resistor and operational amplifier (not shown). The remaining current, I + $I_B$ − $I_1$, is coupled to the negative input terminal of an operational amplifier 42 which has its positive input terminal coupled to a ground reference potential. The output of operational amplifier 42 is coupled to its negative input terminal via a feedback resistor $R_f$. The output voltage of the operational amplifier, designated $V_0$, can be presented as $$V_0 = -R_f(I + I_B - I_1) \tag{8}$$

Substituting equation (7) in equation (8) gives $$V_0 = (R_f/R_i V_{cc})(T_a - T_{ref}) + R_f I_1 \tag{9}$$

It is seen from equation (9) that $R_f$ can be chosen to achieve a desired thermometer scale factor and $I_1$ can be adjusted to the desired zero setting. For example, $R_f$ could be chosen to produce 0.1 volt variation per degree centigrade and $I_1$ could be set so that $V_0 = 0$ at $T_a = 0°$ C.

Figure 3:
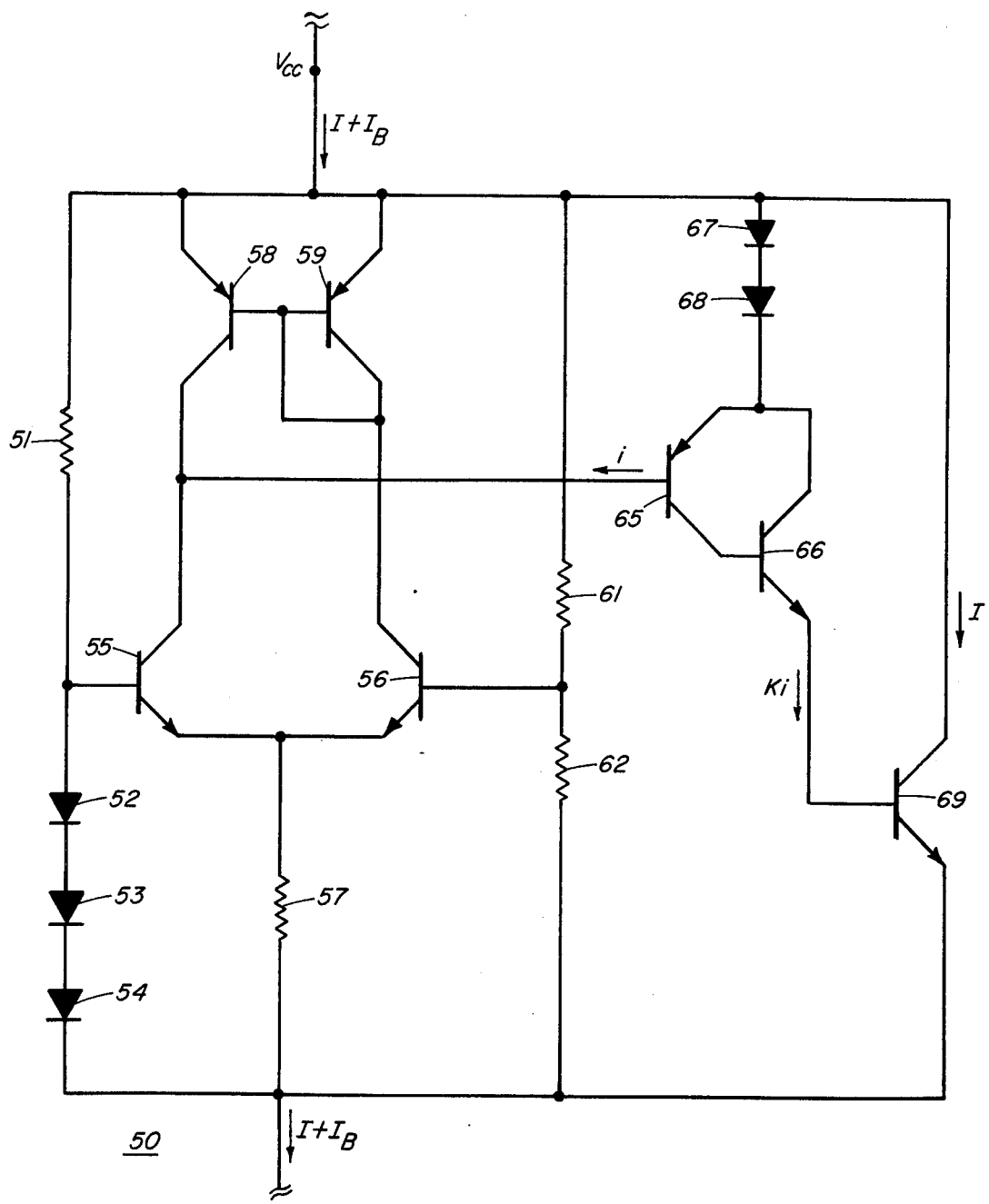
FIG. 3 is a schematic diagram of the circuitry formed in the substrate in the embodiment of FIG. 2.

FIG. 3 is a schematic diagram of the circuitry formed in substrate 50 of FIG. 2. The voltage $V_{cc}$ is applied across a resistor 51 in series with diodes 52, 53 and 54, the PN junctions of the diodes serving as temperature sensors whereby the voltage $V_2$ will vary with the substrate temperature, in known fashion. A reference voltage $V_1$, corresponding to a desired equivalent reference temperature $T_{ref}$, is obtained from the voltage divider consisting of resistors 61 and 62. The transistors 55 and 56, in conjunction with the emitter resistor 57 form a differential amplifier (comparator). The transistors 58 and 59 comprise an active load, and the output of this active load is the current designated i which is amplified by the composite transistor 55, 56. The diodes 67 and 68 provide a DC offset voltage. The amplified emitter current of transistor 66, Ki, is fed to the base of the heater transistor 69 and controls the power dissipated by this transistor.

In operation, transistor 69 dissipates an appropriate amount of power to stabilize the temperature, and the amount of power needed, as determined from I (FIG. 2), is a measure of the flow of thermal power from the substrate through the insulator to the environment, and therefore a measure of the temperature of the ambient environment in accordance with equation (6). During operation, the substrate is maintained at a higher temperature than the ambient environment whose temperature is being measured. The current I decreases substantially linearly with an increase in the ambient temperature. For example, a drop in temperature of the ambient environment will cause heat to be drawn from the substrate (through the insulator) thereby momentarily lowering the temperature of the substrate. This will result in a decrease in the voltage $V_2$ which, in turn, will cause the current i to increase. Transistor 69 will thus be driven harder so that the power dissipated by transistor 69 tends to return the substrate to its original temperature. The increase in the power dissipated by transistor 69 is therefore a measure of the ambient temperature.

Figure 4:
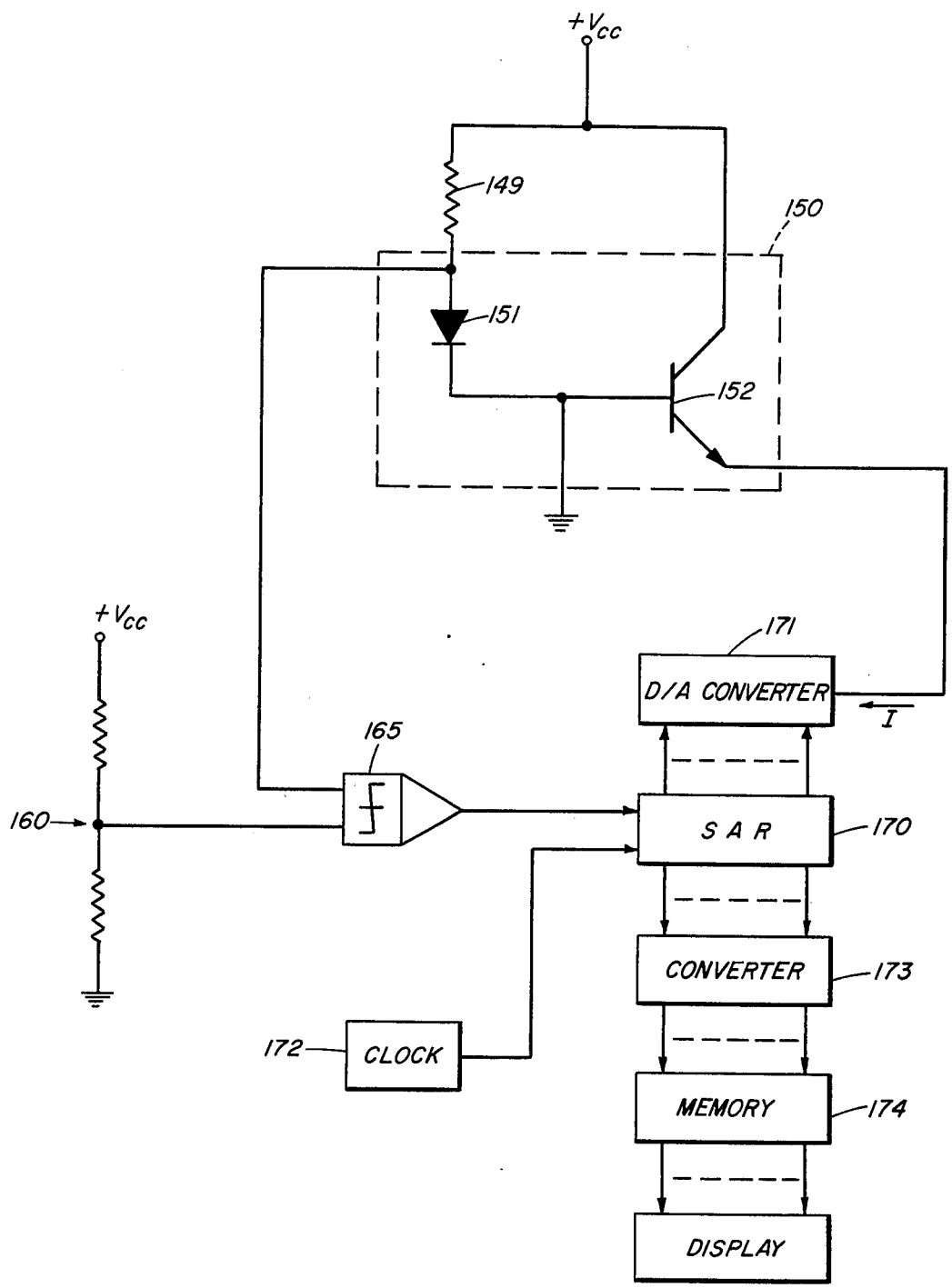
FIG. 4 is a schematic block diagram of another embodiment of the invention.

FIG. 4 illustrates an embodiment of the invention wherein the control signal is converted to digital form within the feedback loop of the thermal circuit, this configuration being advantageous in that it facilitates digital display of the measured thermal power in an efficient manner. In the embodiment of FIG. 4, a substrate 150 such as a semiconductor chip, has a diode 151 and heater transistor 152 formed therein. (It will be understood that further components could be included on the chip, if desired.) The diode 151, energized by bias voltage $V_{cc}$ via resistor 149, is utilized as a temperature sensor and its output is compared with a reference voltage established by voltage divider 160, the voltage divider being independent of temperature. The output of a comparator 165 is a two level signal indicating whether the chip temperature is above or below the reference level.

The comparator output controls a successive approximation register ("SAR") 170 whose output is coupled to a digital to analogue ("D/A") converter 171. The output of the D/A converter 171 is an analog current, I, which drives the heater transistor 151. A clock 172 controls the SAR 170. The SAR will tend to accumulate a digital word which reflects the heater drive current I.

In the embodiment of FIG. 4 the SAR 170 operates continuously. The contents of the SAR are converted to binary coded decimal by a converter 173. After a predetermined number of clock pulses, as determined by counter 172, the contents of the converter 173 are transferred in parallel into a memory register 174. The memory register, in turn, drives a digital display, such as a light emitting diode display. After each N clock pulses, a decimal number is displayed which represents the latest reading of the flow of thermal power from the chip. It is seen that this SAR technique for obtaining a digital readout does not require its own separate feedback loop since the feedback is accomplished via the thermal circuit.

The invention has been described with reference to particular embodiments, but it will be appreciated that variations within the spirit and scope of the invention will occur to those skilled in the art. For example, while the device has been described in the context of use as a thermometer by virtue of the flow of thermal power through an insulator, it will be understood that the substrate can be in direct contact with the environment being measured in certain applications where it is desired to measure the flow of thermal power from a substantially constant temperature device. Also, it will be understood that some of all of the "external" circuitry of FIGS. 2 or 4 could be formed on the common substrate.

I claim:

1. Apparatus for measuring the temperature of an environment, comprising:
   a semiconductor substrate;
   an insulator surrounding the substrate and separating the substrate from the environment;
   temperature sensing means formed in said substrate for generating a first electrical signal as a function of the temperature of said substrate;
   means for generating a reference level;
   a comparator responsive to said first electrical signal and said reference level for generating a control signal indicative of whether or not said first electrical signal exceeds said reference level;
   a successive approximation register responsive to said control signal;
   digital to analog converter means for converting the contents of said successive approximation register to an analog signal;
   heater means formed in said substrate;
   means for electrically driving said heater means in response to said analog signal; and
   means for displaying the contents of said successive approximation register;
   the displayed value being indicative of the rate of heat flow through the insulator, and therefore indicative of the temperature of the ambient environment.

* * * * *